United States Patent
Dolan

[19]

[11] Patent Number: 5,814,249
[45] Date of Patent: Sep. 29, 1998

[54] SUPPORT PLATE

[75] Inventor: Michael J. Dolan, Brecksville, Ohio

[73] Assignee: Norton Chemical Process Products Corporation, Stow, Ohio

[21] Appl. No.: 821,628

[22] Filed: Mar. 20, 1997

[51] Int. Cl.$^6$ .................................................. B01F 3/04
[52] U.S. Cl. ............................. 261/97; 96/290; 261/94
[58] Field of Search ............... 52/670–672; 55/233, 55/512, 515; 95/274; 96/119, 120, 139, 290; 261/94, 96, 97

[56] References Cited

U.S. PATENT DOCUMENTS

| | | | |
|---|---|---|---|
| 3,064,954 | 11/1962 | Eckert | 261/98 |
| 3,222,041 | 12/1965 | Eckert | 261/94 |
| 3,419,253 | 12/1968 | Eckert | 261/96 |
| 4,744,929 | 5/1988 | Robinson et al. | 261/97 |
| 5,000,883 | 3/1991 | Leva | 261/97 |
| 5,510,061 | 4/1996 | Moore | 261/94 |

FOREIGN PATENT DOCUMENTS

| | | | |
|---|---|---|---|
| 0 517 670 A | 12/1992 | European Pat. Off. | 261/97 |
| 1264957 | 10/1986 | U.S.S.R. | 261/94 |

Primary Examiner—C. Scott Bushey
Attorney, Agent, or Firm—David Bennett

[57] ABSTRACT

Support plates for packing materials in mass transfer towers made using parallel beams with generally inverted U-shaped cross-sections which contact one another along a line running the length of the beams, are provided with a trough member supported directly under the contact line between adjacent beams.

2 Claims, 1 Drawing Sheet

SUPPORT PLATE

BACKGROUND OF THE INVENTION

This invention relates to mass and heat transfer facilities and specifically to vessels containing packing elements, either structured or dumped, within the vessel. Such packing generally rests upon a support plate at the bottom of a packed section. It is to such support plates that this invention specifically pertains.

The support plate useful with dumped packing conventionally comprises a number of parallel members with the configuration, in cross-section, of an inverted "V" or "U" and laid side by side. For structured packing the support plate usually comprises a flat grid made up of flat bars or beams. Such support plates do not usually cause the problems discussed below. However, to the extent that the specific design for a structured packing support plate gives rise to similar problems, the present invention can also be used with such support plates.

Suitable support plates must be capable of handling fluid flow through the vessel. In some cases there may be a single fluid passing in either direction while in other cases there may be countercurrent flow of gas and liquid streams through the vessel. If the liquid flow passing through the support plate has excessive local concentrations, this can create local overload conditions that negatively impact the effective operation of the tower.

It has been found that a problem can arise when a large proportion of the liquid flowing through the support plate exits between the adjacent members that comprise the plate. If this flow should be aligned such that a locally excessive flow is directed to an area through which counter-current gas is flowing, effective separation efficiency and capacity could be lost.

This is particularly serious when the containing tower comprises a plurality of beds each comprising large amounts of packing elements, particularly but not necessarily exclusively dumped packing elements, resting on a support plate. Reconstruction to avoid flow problems which develop as a result of unexpected circumstances or design flaws could involve unloading the tower, This would usually mean that several days would elapse before the tower could be back in action.

A technique has now been devised to avoid such excessive localized flow conditions that is well adapted for fitting as original equipment or for retro-fitting to an existing support plate to correct deviations from optimum flow patterns. Because the device is very simple it can be installed without unloading a fully loaded mass transfer tower having multiple beds if access is available to the space between the beds to correct poor flow patterns from the support plate supporting the upper bed. Thus corrective action is readily performed in a fraction of the time normally required to service a loaded mass transfer tower.

GENERAL DESCRIPTION OF THE INVENTION

The present invention provides a support plate for supporting a plurality of mass transfer elements in a mass transfer tower which comprises a plurality of parallel elongated channel beams with a generally U-shaped cross-section with the beams generally in contact with the beams on either side and, suspended below the line along which adjacent beams are in contact, a trough with a generally U-shaped cross-section having at least one outflow point and extending essentially the length of the line of contact between adjacent beams.

The trough is attached to the channel beams so that it is retained securely in place while the tower is in use. Since the support plate is usually intended to be dismantled from time to time for service reasons or because the tower is to be redesigned, the adjacent beams preferably remain separable. In the most simple arrangement, the trough is suspended on rods attached to adjacent beam members by means such as a hook, an eyelet bolt, or a simple nut and bolt arrangement. The sides of the beam members are conventionally provided with perforations to allow gas flowing upwards into the packed materials supported on the support plate. In an alternative arrangement these holes can be used to retain a rod passing through holes on adjacent beams and providing an anchorage for the support rods by which the trough is suspended below the beams.

It is also possible to design the beams such that, where the beam has a generally inverted U-shaped cross-section, one of the arms of the U has a lateral shallow U-shaped extension that, when the beam is in place in the support plate, extends under the line of contact with the adjacent beam to form a trough extending under the line of contact between adjacent beams. In this case no separate attachment means would be required.

The trough is provided with at least one outflow point that can be used to allow the liquid to exit the tower via a drain or it can feed a common distributor trough ensuring uniform feed to a bed directly below. More than one outflow point can be provided if desired.

The channel beams conventionally have sloping sides pierced by perforations to permit passage of upflowing gas and downflowing liquid. They are also preferably supplied with flanges along the lengths of the arms (or legs) of the U-shaped cross-section so as provide a spacing from the adjacent beam or beams and the line of contact is the line of contact between the flanges on the adjacent beams.

DRAWINGS

In the attached Drawing:

FIG. 1 is a perspective drawing of a preferred structure of the invention.

DESCRIPTION OF THE PREFERRED EMBODIMENTS

Figure 1:
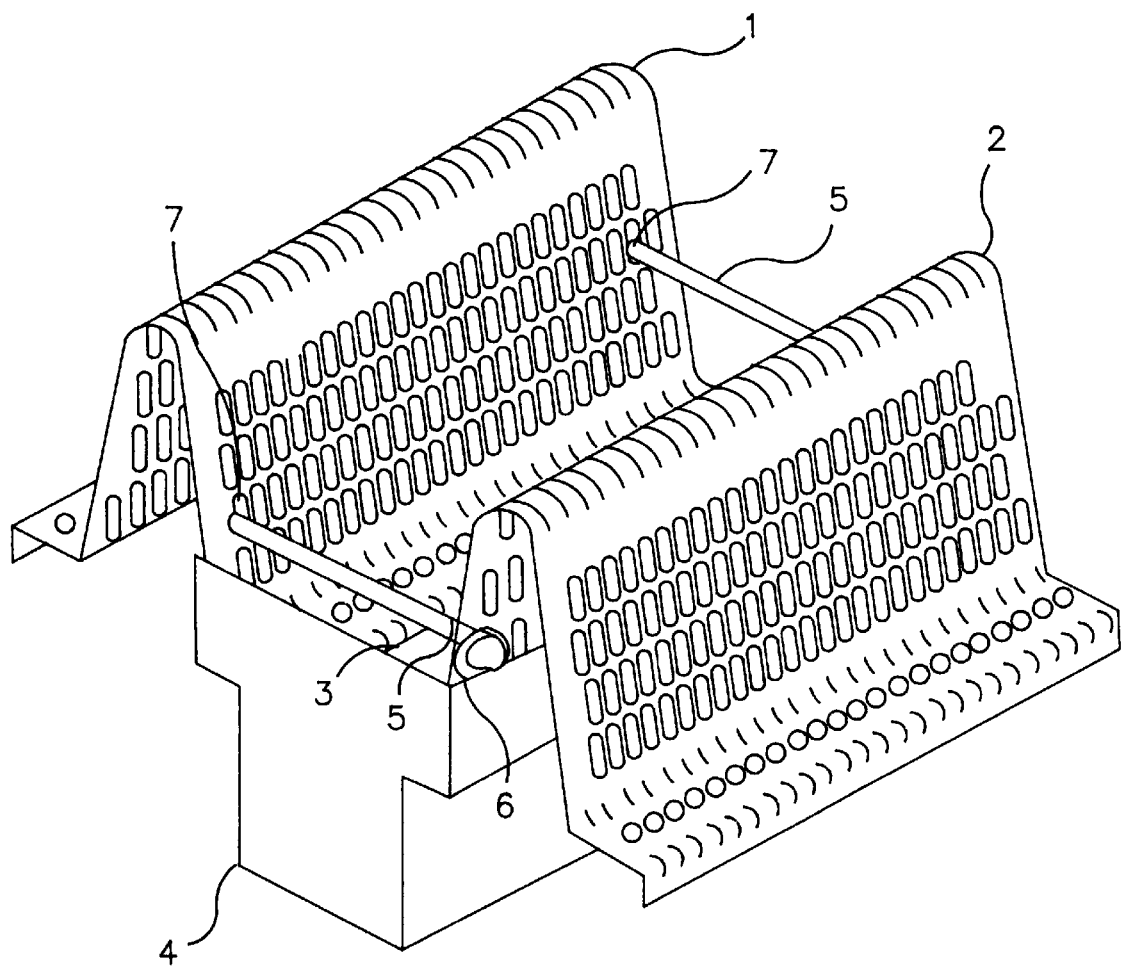

The invention is now described with specific reference to the drawing which illustrates the construction and use of a portion of a preferred support plate with trough attachment according to the invention. This is for the purpose of illustration only and implies no essential limitation on the scope of the invention.

In the drawings, adjacent channel beams, 1 and 2, having a generally U-shaped cross-section are aligned such they contact one another along line, 3. A collector trough, 4, is suspended below the line, 3, by rods, 5, which pass through perforations, 7, in the walls of the adjacent beams, 1 and 2, and extend through ring extensions, 6, attached to the tops of the side walls of the trough.

A plurality of such support structures is conventionally provided along the length of the trough. The structure shown can very readily be retrofit to an existing tower or it can be installed as part of the original equipment.

The material from which the troughs can be constructed depends largely on the environment in which it is to function. Because of the weight to be supported, steel is usually the preferred material with a stainless steel being particularly preferred. Other materials can however be substituted in appropriate circumstances.

In use the support plate can be used to support either structured or dumped packing as desired. It will be appreciated that the support plate can be assembled and disassembled in a confined space without difficulty and can be reused in many different configurations. It therefore represents an extremely adaptable and versatile means of constructing support plates for mass transfer vessels.

What is claimed is:

1. A support plate for supporting a plurality of mass transfer elements in a mass transfer tower which comprises a plurality of separate parallel elongated channel beams each having a generally inverted U-shaped cross-section with each beam generally in contact with at least one adjacent beam and, suspended below the line along which adjacent beams are in contact, a trough with a generally U-shaped cross-section having at least one outflow point and extending essentially the length of the line of contact between adjacent beams.

2. A support plate component according to claim 1 in which the trough is supported at least each end of the trough by rods attached to the adjacent beams.

* * * * *